Oct. 7, 1930.         LE ROY A. DUNSTER         1,777,964
                        ANTISKID DEVICE
               Original Filed May 8, 1929    2 Sheets-Sheet 1

L. A. Dunster
INVENTOR
BY Victor J. Evans
ATTORNEY

Oct. 7, 1930.  LE ROY A. DUNSTER  1,777,964
ANTISKID DEVICE
Original Filed May 8, 1929  2 Sheets-Sheet 2
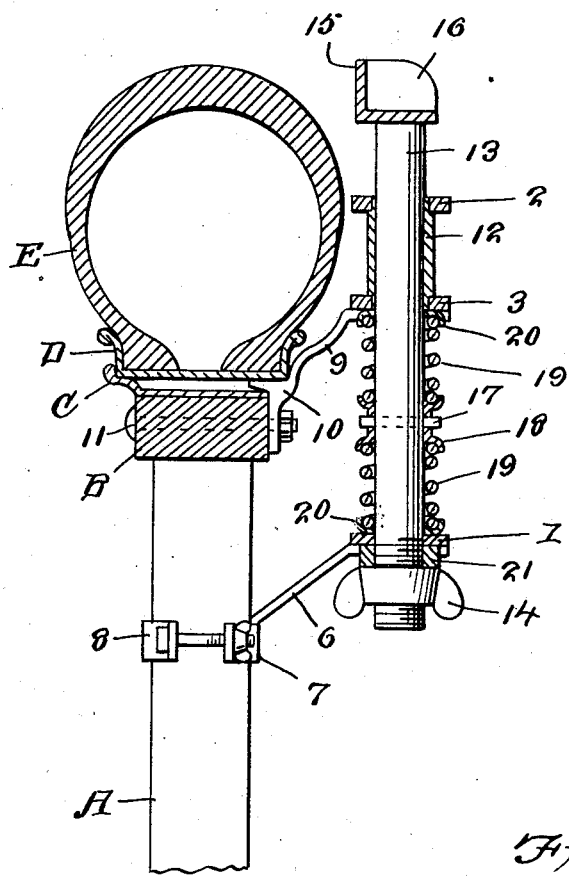
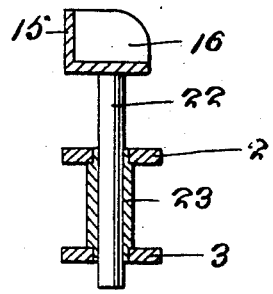
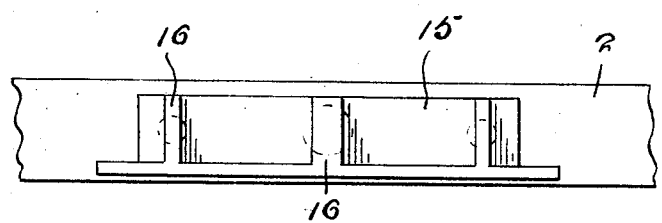
L. A. Dunster
INVENTOR
BY Victor J. Evans
ATTORNEY Patented Oct. 7, 1930

1,777,964

UNITED STATES PATENT OFFICE

LE ROY ALBERT DUNSTER, OF HAMILTON, NEW YORK

ANTISKID DEVICE

Application filed May 8, 1929, Serial No. 361,332. Renewed August 20, 1930.

This invention relates to anti-skid devices for motor vehicle wheels, and its general object is to provide a device of this character that has no connection with the wheel tire, other than for holding the tire rim on its wheel, with the result that damage to the tire by the device will be eliminated but the latter will be effective to prevent skidding, as well as to provide sure traction for the wheel in snow, ice, mud, sand and the like, when it is in use.

Another object of the invention is to provide an anti-skid device that is adjustable with respect to the ground, whereby it can be moved to a ground engaging position, or to a position out of use.

A still further object of the invention is to provide an anti-skid device that is movable and spring pressed for that purpose, but is substantially noiseless in its action.

A still further object of the invention is to provide an anti-skid device that is simple in construction, inexpensive to manufacture, easy to apply, and is efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 2 is a sectional view taken approximately on line 2—2 of Figure 1.

Figure 3 is a sectional view taken approximately on line 3—3 of Figure 1.

Figure 4 is a fragmentary view illustrating one of the ground engaging shoes.

Figure 1:
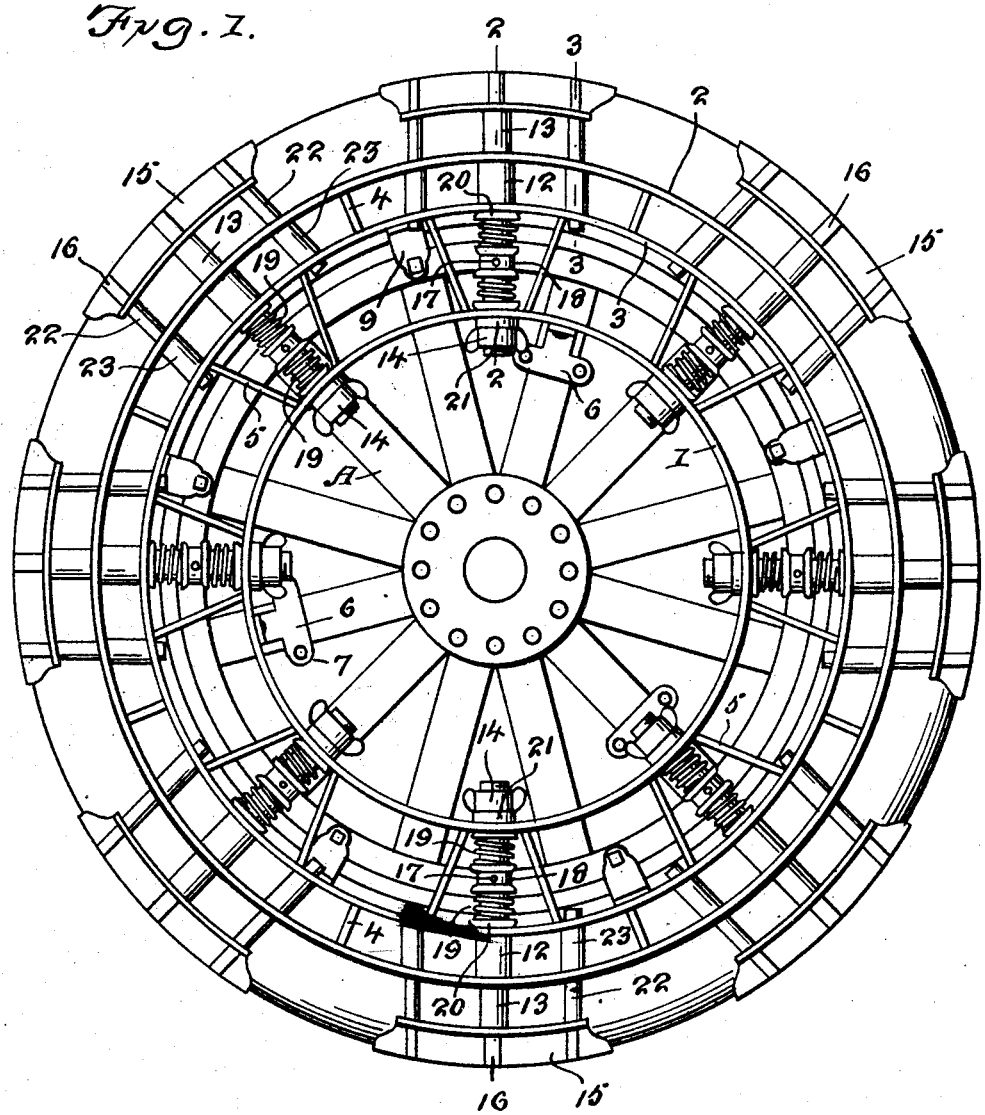
Figure 1 is a side view of my anti-skid device applied to a vehicle wheel.

Referring to the drawings in detail, the letter A indicates the spokes of a vehicle wheel, B the felly, C the felly band, D the tire rim, and E the tire.

The device which forms the subject matter of the present invention includes an inner ring 1, an outer ring 2, and an intermediate ring 3. These rings are flat and are concentrically arranged with respect to each other as best shown in Figure 2. The rings 2 and 3 are connected together through the instrumentality of strips 4, while the rings 1 and 3 are connected together by strips 5, the latter being arranged in pairs and in converging relation with respect to each other as best shown in Figure 1.

The anti-skid device is secured to the vehicle wheel by means carried by the spokes A and the felly B, and this first mentioned means includes brackets 6 having inclined portions that have their outer ends secured to the inner ring 1 while their inner ends have formed or otherwise secured thereto one part 7 of a clamping member, while cooperating with the part 7 is a part 8. The parts 7 and 8 receive the spokes as best shown in Figure 2 and include ears for the purpose of accommodating bolts that pass therethrough and which are provided with thumb nuts whereby the clamping members can be fixedly secured to the spokes as will be apparent.

The means carried by the felly as above set forth include arms 9 that have their outer ends secured to the intermediate ring 3 and their inner ends in the form of lugs 10 which have portions disposed between the felly band C and the tire rim D and apertured portions for the purpose of accommodating the lug bolts 11. By securing the anti-skid device to the vehicle wheel through the medium of the means just described, it is apparent that the anti-skid device has no connection with the tire, with the result it cannot damage the same as generally happens in the usual antiskid devices that are carried by the tires.

Disposed between the rings 2 and 3 are collars 12 which receive plunger rods 13 for slidable movement therethrough. The latter have threaded inner ends to accommodate thumb nuts 14. The outer ends of the plunger rods 13 have secured thereto elongated shoes 15 which provide the ground engaging means for my anti-skid device, and these shoes are angle shape in cross section and disposed between the respective flanges of the shoes are fins 16 that have rounded outer corners as best shown in Figures 2 and 3.

The plunger rods 13 pass through all of the rings and are mounted for slidable movement therein. Surrounding the plunger rods between the rings 3 and 1 and being secured thereto by pins 17 are spring retainers 18 having flanged ends for the purpose of receiving the inner convolutions of coil springs 19 that also surround the plunger rods 13 and have their outer convolutions received by spring retainers 20 which engage the rings 1 and 3 respectively as best shown in Figure 2.

A rubber bumper in the form of a ring 21 is provided for the plunger rods and is disposed between the thumb nuts 14 and the inner ring 1 whereby the plunger rods in their movement will be substantially noiseless.

The plunger rods are guided in their movement by pins 22 that are formed with the shoes and extend inwardly therefrom in converging relation with respect to each other as best shown in Figure 1. The pins 22 are guided by sleeves 23 that are secured between the rings 2 and 3 in any well known manner.

From the above description and disclosure of the drawings, it will be obvious that I have provided an anti-skid device that is extremely efficient to perform its intended functions. The ground engaging shoes are capable of being adjusted through the medium of the thumb nuts 14 that are threaded to the plunger rods 13. By this construction, the shoes can be disposed to ground engaging position or a position out of use, and also to various positions between those mentioned so that the action of the shoes with respect to the ground can be varied in accordance with the circumstances and one's desires.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An anti-skid device having means for securing the same to a vehicle wheel for arrangement laterally thereof and comprising concentrically mounted rings, a collar between two of said rings, sleeves between the last mentioned rings, spring pressed plunger rods mounted for slidable movement through the collars and rings, ground engaging shoes secured to the outer ends of said plunger rods, pins secured to said shoes and mounted for slidable movement through said sleeves, means for adjusting said shoes with respect to the ground and means for securing said rings with respect to a vehicle wheel.

In testimony whereof I affix my signature.

LE ROY ALBERT DUNSTER.